United States Patent

[11] 3,573,499

[72] Inventor Dennis J. Lynes
Madison, N.J.
[21] Appl. No. 821,408
[22] Filed May 2, 1969
[45] Patented Apr. 6, 1971
[73] Assignee Bell Telephone Laboratories, Incorporated
Murray Hill, Berkeley Heights, N.J.

[54] BIPOLAR MEMORY USING STORED CHARGE
7 Claims, 2 Drawing Figs.

[52] U.S. Cl. .......... 307/238, 340/173, 307/291, 307/292
[51] Int. Cl. .......... G11c 11/40
[50] Field of Search .......... 307/238, 280, 281, 291, 292, 300; 328/206; 340/173

[56] References Cited

UNITED STATES PATENTS 3,354,440 11/1967 Farber et al. .......... 340/173
3,492,661 1/1970 Pricer .......... 307/238X

OTHER REFERENCES

Agusta et al., " Single 3-Dimensional Memory Cell," IBM Technical Disclosure Bulletin, V. 8, No. 12, May 1966.

*Primary Examiner*—Donald D. Forrer
*Assistant Examiner*—Larry N. Anagnos
*Attorneys*—R. J. Guenther and Arthur J. Torsiglieri

ABSTRACT: A semiconductor memory characterized by simplified memory cells which operate on the charge storage phenomenon. Each cell comprises a pair of cross-coupled transistors, the collector electrodes of which are connected through separate diodes to a pair of information lines. Power is supplied in pulsed fashion via the information lines. No conventional load impedances are used. The coupling diodes prevent discharge of stored information during intervals in which no power is being supplied. The memory advantageously is embodied as a semiconductor integrated circuit.

INVENTOR
D. J. LYNES
BY
A. J. Torsiglieri
ATTORNEY

BIPOLAR MEMORY USING STORED CHARGE

BACKGROUND OF THE INVENTION

This invention relates to semiconductor memory apparatus and, more particularly, to memory systems having simple semiconductor memory cells which operate on the charge storage phenomenon.

Heretofore, charge storage memory cells have included flip-flops modified by the inclusion of diodes in the cross-coupling paths or in series with the load impedances. When the power supply is removed, the diodes provide a high impedance to prevent the discharge of information evidenced by the state of the individual flip-flop transistors. Such memory systems are described in more detail in the copending U.S. application (S. Brojdo 1) Ser. No. 764,186, filed Oct. 1, 1968.

SUMMARY OF THE INVENTION

An object of this invention is a semiconductor memory system in which the memory cells require no standby power dissipation.

A further object of this invention is a simplified charge storage memory cell.

To these and other ends, I have invented a semiconductor memory system characterized by simplified charge storage memory cells which have no conventional load impedances and which require no standby power dissipation.

In a particular embodiment, the basic cell comprises a pair of matched junction transistors, the base electrode of each being connected to the collector electrode of each being connected to the collector electrode of the other. The emitter electrode of each is connected to the emitter electrode of the other and to a common word line terminal. The collector electrode of each is also connected through a separate unilaterally conductive means to separate ones of a pair of digit line terminals. Accordingly, each cell includes only three terminals, one of which is connected to a word line and two of which are connected to a pair of digit lines.

In operation, information is written into a cell by establishing a voltage imbalance between the pair of digit lines so as to turn on the desired one of the two transistors.

Nondestructive read out of information is achieved by reducing the voltage on the word line and differentially detecting the dynamic current in the pair of digit lines.

Standby power is not required because the unilaterally conductive means prevents the discharge of information evidenced by the states of the transistors.

One advantage of this invention is that the absence of a standby power requirement reduces the problem of volatility of stored information. More specifically, if the main power source is disrupted, there is sufficient time for automatic emergency power sources to begin operation before stored information is lost.

BRIEF DESCRIPTION OF THE DRAWING

The invention will be better understood from the following more detailed description taken in conjunction with the accompanying drawing, in which.

DETAILED DESCRIPTION

Figure 1:
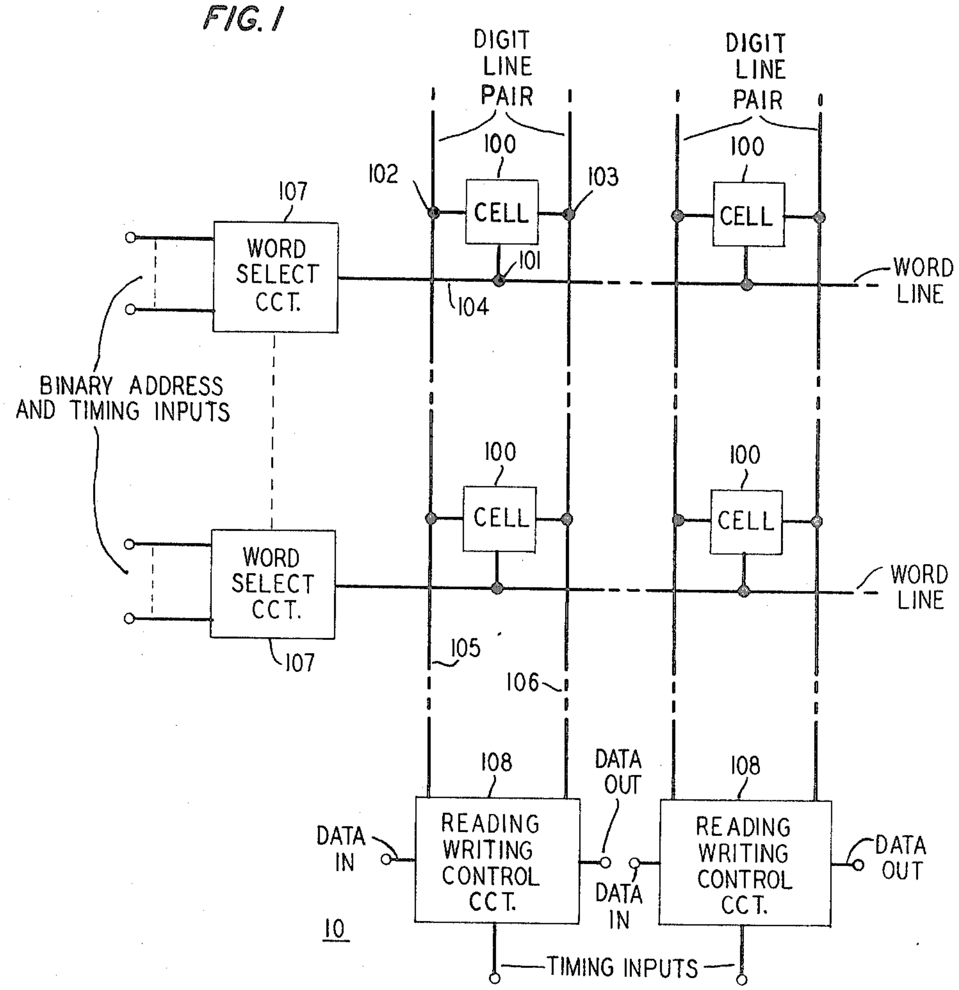
FIG. 1 shows in block circuit form a charge store memory system in accordance with this invention.

With reference now to the drawing, in FIG. 1 are shown the basic elements of a word-organized charge storage memory system 10 in accordance with this invention. A plurality of individual storage cells 100 are arranged in a two-dimensional array of rows and columns in conventional fashion. In essence, each cell is a semiconductor storage circuit having two stable states between which it can be switched for the storage of binary digits. As seen, each cell is provided with three terminals, one of which, 101, is connected to a word line 104; and the other two of which, 102 and 103, are connected to a pair of digit lines 105 and 106, respectively. Each word line is driven by a word select circuit 107, to which are supplied binary address and timing inputs in the usual fashion. Each pair of digit lines is connected to its own reading and writing control circuit 108, to which are applied storage data and timing inputs and from which are derived the stored data.

Figure 2:
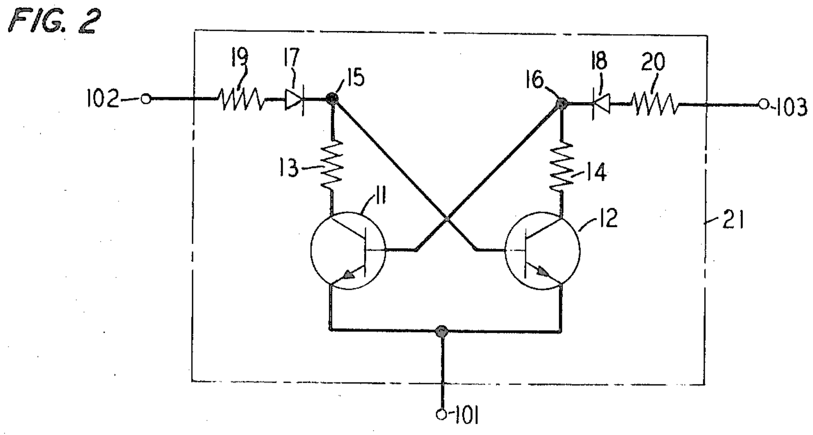
FIG. 2 shows a schematic circuit diagram of a charge storage memory cell especially suitable for use in the memory system of FIG. 1.

In FIG. 2 there is shown a circuit schematic of a charge storage memory cell especially suitable for use as the cell 100 in the memory cell shown in FIG. 1. More specifically, the circuitry shown inside the broken line rectangle 21 in FIG. 2 comprises the inner structure of the cell 100 in FIG. 1. As shown, the cell comprises a pair of matched junction transistors 11 and 12, shown here illustratively of the NPN type, cross coupled in flip-flop fashion. To this end, the collector of transistor 11 is connected through a resistance 13 to a node 15 which is, in turn, connected to the base of transistor 12. The collector of transistor 12 is connected through a resistance 14 to a node 16 which is, in turn, connected to the base of transistor 11. The emitter of transistor 11 is connected to the emitter of transistor 12 and to a word line terminal 101. Node 15 is connected serially through a diode 17 and a resistance 19 to a digit line terminal 102. Node 16 is connected serially through a diode 18 and a resistance 20 and to a second digit line terminal 103.

It will be appreciated that the charge storage memory cell of FIG. 2 includes no conventional load impedances or power supplies coupled to the collectors of the flip-flop transistors 11 and 12.

In operation, each of the memory cells 100 normally is maintained at a quiescent standby level at which the word line terminal 101 is connected to about 3.5 volts and the digit line terminals 102 and 103 are connected to about 1.6 volts so that diodes 17 and 18 are reverse biased. In this condition, any charge which is stored in transistors 11 and 12 is virtually trapped there because its only discharge path is through the very high impedance of reverse-biased diodes 17 and 18 (typically $10^{11}$ ohms). Using high quality diodes, the time constant of this discharge path can be made as long as about 1 second.

For writing into the cell of FIG. 2, the voltage level at word line terminal 101 is reduced nearly to electrical ground level, e.g., 0.2 to 0.4 volts, and the voltage at one of the digit line terminals, e.g., 102, is raised to about 3.5 volts while the other digit line terminal, e.g., 103, is maintained at the 1.6 volt standby level. Under these voltage conditions, current flows in the forward direction through diode 17 and divides between resistance 13 and the base of transistor 12. In the regenerative manner characteristic of flip-flops, once current starts flowing into the base of transistor 12 its collector voltage and consequently the base voltage of transistor 11 is lowered. Accordingly, transistor 12 turns on and transistor 11 turns off. After the transistor pair has been set in the desired state, the voltage at word line terminal 101 is returned to the standby level (3.5 volts) and the voltage at both digit line terminals is also returned to the standby level (1.6 volts). In this condition, the only discharge path for charge stored in the base region and in the base-collector capacitance and in the base-emitter capacitance of transistor 12 is through diode 17 in the reverse direction. Accordingly, such stored charge will remain trapped there for as long as 1 second, as mentioned hereinabove.

Because of their extremely small minority carrier storage, Schottky-barrier diodes advantageously are used for the diodes 17 and 18 in FIG. 2. The reverse-recovery time of these diodes is minimal; and, accordingly, the amount of charge lost from the transistors during the turnoff time of these diodes accordingly is minimized.

It will be appreciated that for a writing operation in which it is desired to turn on transistor 11 and turn off transistor 12, the sequence of operations would be to lower the word line voltage to near ground level and to raise the voltage at digit line terminal 103 to 3.5 volts while maintaining the voltage on digit line terminal 102 at the 1.6 volt standby level.

For nondestructive read out of information from the cell of FIG. 2, the voltage at word line terminal 101 is reduced to near electrical ground and the dynamic current flowing into digit line terminals 102 and 103 is differentially detected in a balanced detector of any of a variety of types well known in the art, e.g., the type described in the copending U.S. application (Lynes-Waaben 1—3) Ser. No. 614,237, filed Feb. 6, 1967 and assigned to the assignee hereof.

If charge was stored in transistor 12 prior to the readout operation, the imbalance caused by the stored charge will cause transistor 12 to turn on preferentially to transistor 11 when the voltage at word line terminal 101 is reduced. With transistor 12 turned on and transistor 11 turned off, more current will be drawn from digit line terminal 103 into the collector of transistor 12 than from terminal 102 into the base of transistor 12. Similarly, if transistor 11 is turned on, a greater current would be drawn from digit line terminal 102 than from terminal 103.

It will be appreciated that inasmuch as one of the transistors turns on during a read operation that operation serves to restore decayed charge in that transistor. Accordingly, if the memory system is designed so that every cell periodically is read with a period less than the time for destructive discharge, no information will be lost.

Alternatively, if it is not convenient to design this system to provide for periodical reading operation, one can build a restore function into the reading and writing control circuits 108 in FIG. 1 to ensure that each cell periodically is turned on to restore decayed charge. The design of this restore circuit is within the scope of the art and will not be discussed further herein.

It will be understood that the aforementioned voltages are presented only for example and are not critical. The absolute values are selected in accordance with the desired system speed of operation, noise margin, etc. in accordance with techniques well known in the art for similar systems. It must be remembered, however, that the relative voltage levels should be selected such that during a read operation not enough voltage is developed at nodes 15 and 16 in FIG. 2 to switch the state of the cell.

Of course, depending on the particular application, a destructive read out may be desired, in which case the above consideration would not be applicable.

The regenerative action and general operation of the cell in FIG. 2 could be obtained without the presence of resistances 13, 14, 19, and 20, but their presence eliminates the dependence of cell operation on the current gain of transistors 11 and 12. These resistances may be eliminated if this advantageous feature is not desired. However, with the aforementioned voltage levels, resistances 13 and 14 typically may be about 800 ohms and so may be provided intrinsically by an appropriate design of the parasitic collector series resistance of those transistors. Similarly, resistances 19 and 20 typically may be about 1600 ohms and may be provided intrinsically by the parasitic series resistance of diodes 17 and 18, respectively. Thus, it will be appreciated that nodes 15 and 16 in FIG. 2 may represent the collector electrodes of transistors 11 and 12, respectively, and terminals 102 and 103 may be connected directly to the anode electrodes of diodes 17 and 18, respectively.

The length of time between required charge restoring operations can be increased by putting extrinsic capacitors in parallel with the base-collector junctions of transistors 11 and 12 to increase the magnitude of charge stored in connection with the on transistor. Of course, for a given resistance in a discharge path, a greater amount of stored charge necessarily implies a longer decay time.

The memory system employed in FIGS. 1 and 2 can be easily adjusted for optical writing of signals in conjunction with electronic read out of information. In this mode, the transistors 11 and 12 would be designed for photosensitive operation. To write optically into the cell of FIG. 2, the voltage at word line terminal 101 would be reduced to near electrical ground and the voltage at both digit line terminals 102 and 103 would be raised to about 3.5 volts so that both transistors 11 and 12 would be turned on equally. In this mode, charge photogenerated by an optical signal applied to one of the two transistors would establish therebetween an imbalance which would cause the cross-coupled transistors regeneratively to latch in the desired state when the voltage at both digit line terminals was simultaneously reduced to the 1.6 volt standby level. Electronic readout would be accomplished as described hereinabove.

It is to be understood that the embodiments described are merely illustrative of the general principles of the invention. Various modifications will be apparent to a worker in the art without departing from the spirit and scope of the invention. For example, the NPN transistors can be replaced by PNP transistors providing the relevant voltages and diode polarities are reversed. Similarly, the NPN transistors can be replaced by field effect transistors.

Still further, the diodes coupling the transistors to the digit lines can be replaced by any of a variety of asymmetrically conductive devices well known in the art, e.g., junction transistors and field effect transistors.

Still further, it will be appreciated that by appropriate changes to the individual cells, particularly to include an "AND" function, the principles of this invention can be extended to a bit-organized memory and to an associative memory.

I claim:

1. Semiconductor memory apparatus comprising:

a plurality of bistable storage cells;

means forming a plurality of conduction paths for connecting the cells to circuitry adapted for selectively controlling and sensing the state of each cell;

characterized in that each storage cell comprises;

a pair of transistors, each having emitter-base, and collector electrodes;

means connecting the collector electrode of each transistor to the base electrode of the other transistors;

means connecting the emitter electrode of each transistor to the emitter electrode of the other transistor and to one of said conduction paths;

separate unilaterally conductive means connected between the collector electrode of each transistor and separate ones of a pair of said conduction paths, said unilaterally conductive means adapted for alternately coupling and decoupling the collector electrodes from the pair of conduction paths; and said cell being free of any load impedances coupled thereto except through the unilaterally conductive means.

2. Apparatus as recited in claim 1 wherein said unilaterally conductive means comprises a diode.

3. Apparatus as recited in claim 2 wherein the series resistance of the diode is approximately twice the collector series resistance of the transistor to whose collector it is coupled.

4. Apparatus as recited in claim 2 wherein said diode is a fast-recovery diode.

5. Apparatus as recited in claim 2 wherein said diode is a Schottky-barrier diode.

6. Apparatus as recited in claim 1 wherein each of said unilaterally conductive means is poled to pass current in the easy direction from one of said pair of said conduction paths into the cell.

7. Apparatus as recited in claim 6 wherein each of said unilaterally conductive means comprises a Schottky-barrier diode, the anode of which is connected to one of said pair of said conduction paths and the cathode of which is connected to the collector electrode of one of said transistors.